US006281893B1

(12) United States Patent
Goldstein

(10) Patent No.: US 6,281,893 B1
(45) Date of Patent: *Aug. 28, 2001

(54) METHOD AND APPARATUS FOR PROVIDING AN OBJECT ORIENTED APPROACH TO A DEVICE INDEPENDENT GRAPHICS CONTROL SYSTEM

(75) Inventor: Richard M. Goldstein, Sunnyvale, CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/626,156

(22) Filed: Apr. 4, 1996

(51) Int. Cl.$^7$ ............................................ G06F 3/14
(52) U.S. Cl. ............................................ 345/335; 709/316
(58) Field of Search .................................... 395/600, 684, 395/687, 310–332; 709/300, 304, 303

(56) References Cited

U.S. PATENT DOCUMENTS

| 5,301,316 | * | 4/1994 | Hamilton et al. ........................ 707/10 |
| 5,307,490 | * | 4/1994 | Davidson et al. ..................... 709/328 |
| 5,446,842 | * | 8/1995 | Schaeffer et al. ..................... 709/205 |
| 5,479,603 | * | 12/1995 | Stone et al. ........................... 345/326 |
| 5,544,320 | * | 8/1996 | Konrad .................................. 709/203 |
| 5,596,702 | * | 1/1997 | Stucka et al. ......................... 345/340 |
| 5,671,345 | * | 9/1997 | Chotak ................................... 345/433 |
| 5,717,877 | * | 2/1998 | Orton et al. ........................... 345/326 |
| 5,729,704 | * | 3/1998 | Stone et al. ........................... 345/346 |
| 5,819,077 | * | 10/1998 | Koga et al. ........................... 712/220 |

FOREIGN PATENT DOCUMENTS 737 917 A2   10/1996   (EP) .................................. G06F/9/44
800 134 A2   10/1997   (EP) .................................. G06F/9/44

OTHER PUBLICATIONS

PostScript® Language Reference Manual, Second Edition, Adobe Systems Incorporated, Addison–Wesley Publishing Company, Inc., 1992 (Table of Contents only).

Programming the Display PostScript™ System with X™, Adobe Systems Incorporated, Addison–Wesley Publishing Company, Inc., 1993 (Table of Contents only).

(List continued on next page.)

Primary Examiner—John Courtenay, III
(74) Attorney, Agent, or Firm—Hogan & Hartson LLP

(57) ABSTRACT

A method and apparatus for exploiting the power of existing device independent graphics and text manipulations, while providing a high level of client-side performance for interactive applications using an object oriented client-side library of constructs. The client-side constructs are analogous to the constructs of a selected server-side imaging model, so that the power and performance of existing imaging models (for example, constructs of the PostScript language) are exploited. In an exemplary embodiment, the client-side constructs are provided for use with the C++ programming language. By establishing a client-side object model using a library of constructs analogous to server-side imaging model constructs, program execution speed and efficiency can be improved without sacrificing the device independence of the imaging model. Using a common base class (i.e., a base class common to all output device platforms), an inherent level of transparency between printing to a display and printing to a file or to a printer is achieved in the client-side application development. Thus, the coupling of a complete representation of a given imaging model with the advantages of an object model written in a high level compiled language, such as the strongly-typed C++ language, enables true what-you-see-is-what-you-get (WYSIWYG) applications to be efficiently developed and implemented.

34 Claims, 4 Drawing Sheets

OTHER PUBLICATIONS

G. Fairhurst et al: "NeWS and Simula: An extensible graphics language for an extensible programming language?" Proceedings of the Seventeenth Simula Users' Conference, Aug. 29–31, 1990, Pilsen, Czecholovkia, pp. 33–45.

H. Muller et al: "The Use of Mutimethods and Method Combination in a CLOS Based Window Interface" OOPSLA '89—Conference Proceedings, Oct. 1–6, 1989, New Orleans, Louisiana, US, pp. 239–252, XP000299247 * the whole document *.

W.C. Dietrich Jr., et al: "Saving a Legacy with Objects" OOPSLA '89 Proceedings, Oct. 1–6, 1989, New Orleans, Louisiana, US, pp. 77–83, XP000299231 * the whole document*.

Yelland P M: "Creating Host Compliance in a Portable Framework: A Study in the Reuse or Design Patterns" ACM SIGPLAN Notices, vol. 31, No. 10, Oct. 1996, pp. 18–29, XP000639198 *the whole document*.

O.M. Densmore: "Objects Oriented Programming in NeWS" USENIX Association—Third Computer Graphics Workshop—Proceedings, Nov. 20–21, 1986, Monterey, CA, US, pp. 117–135, XP002053405 "the whole document".

* cited by examiner

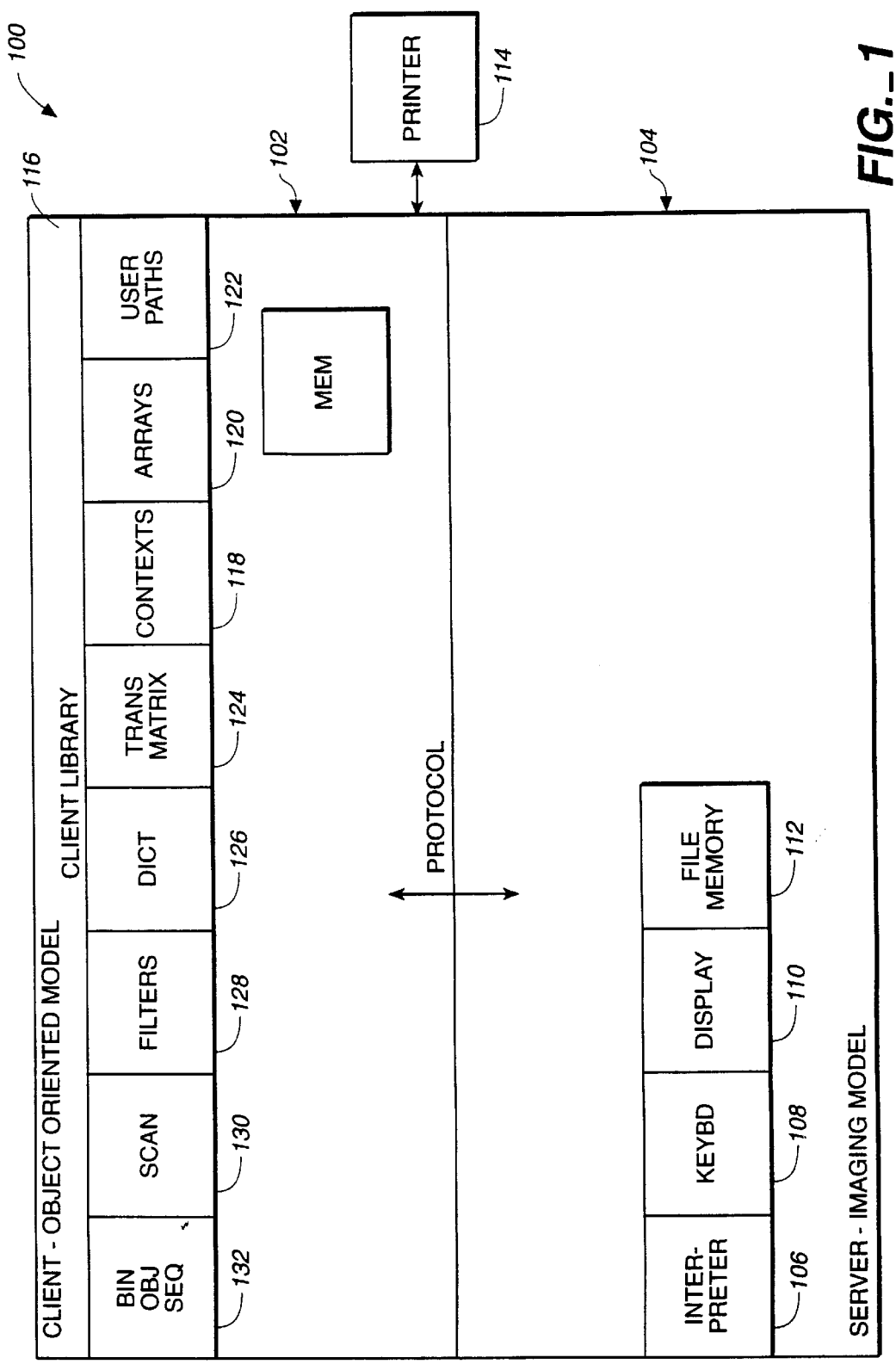
FIG._1

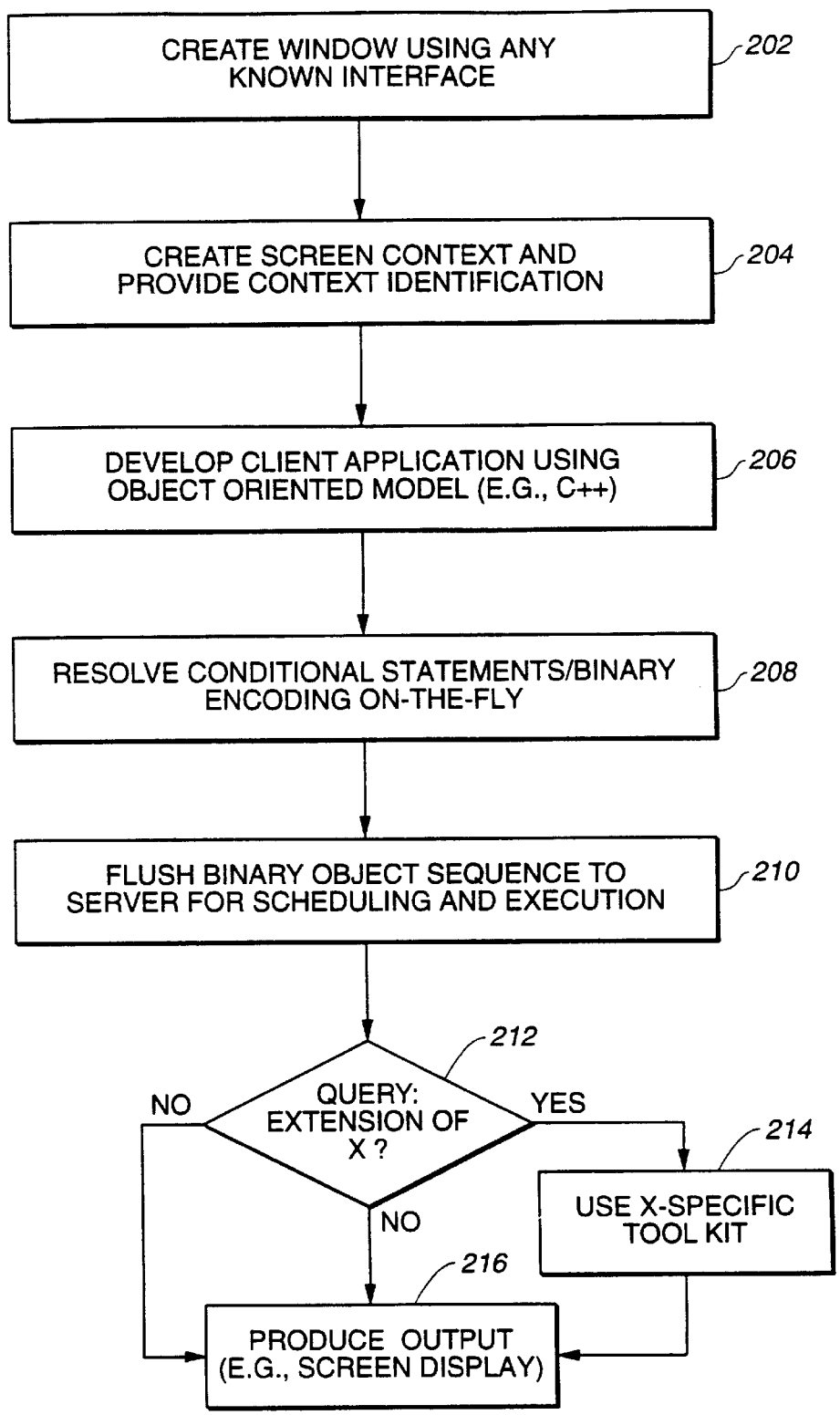
FIG._2

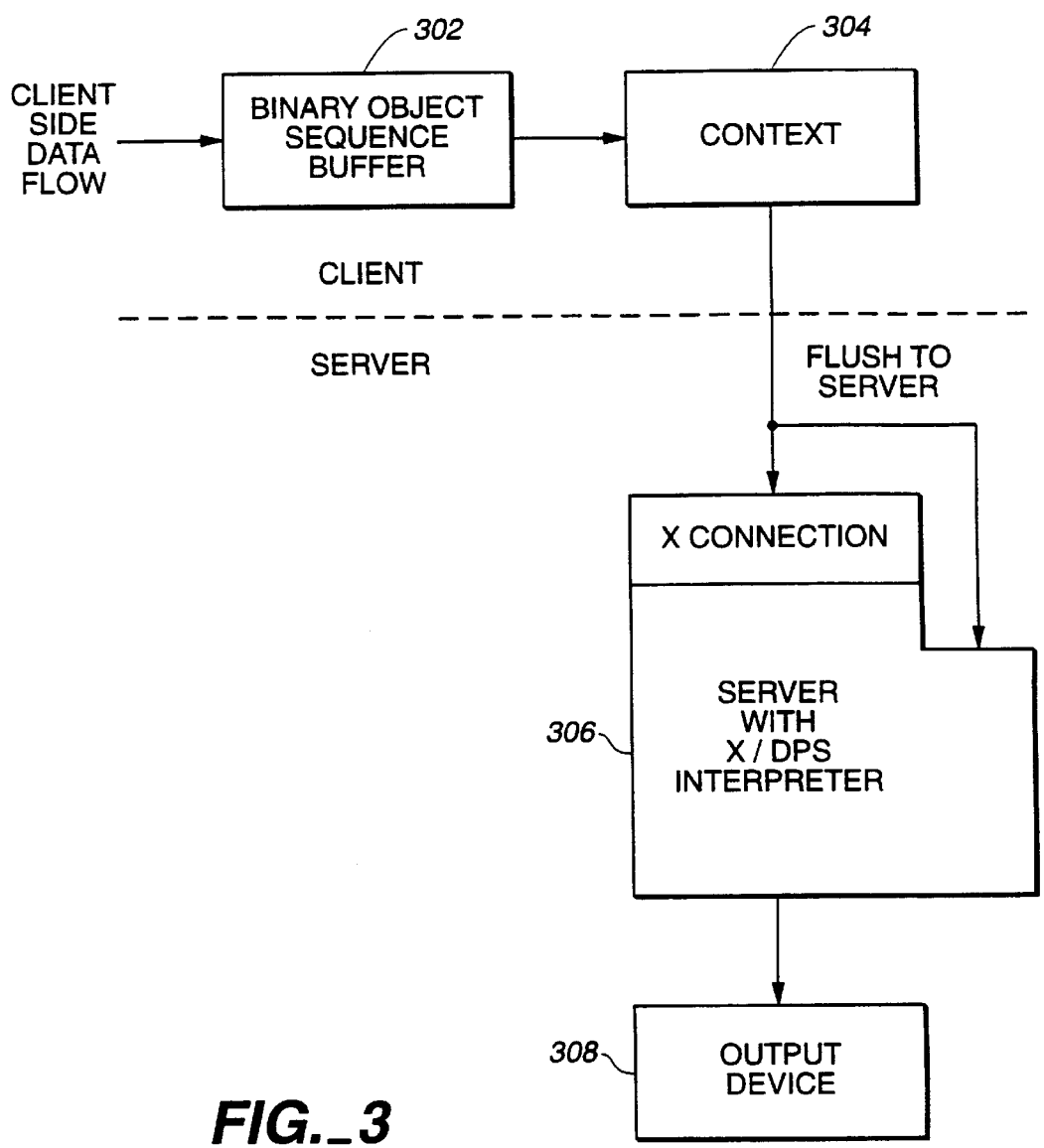
FIG._3

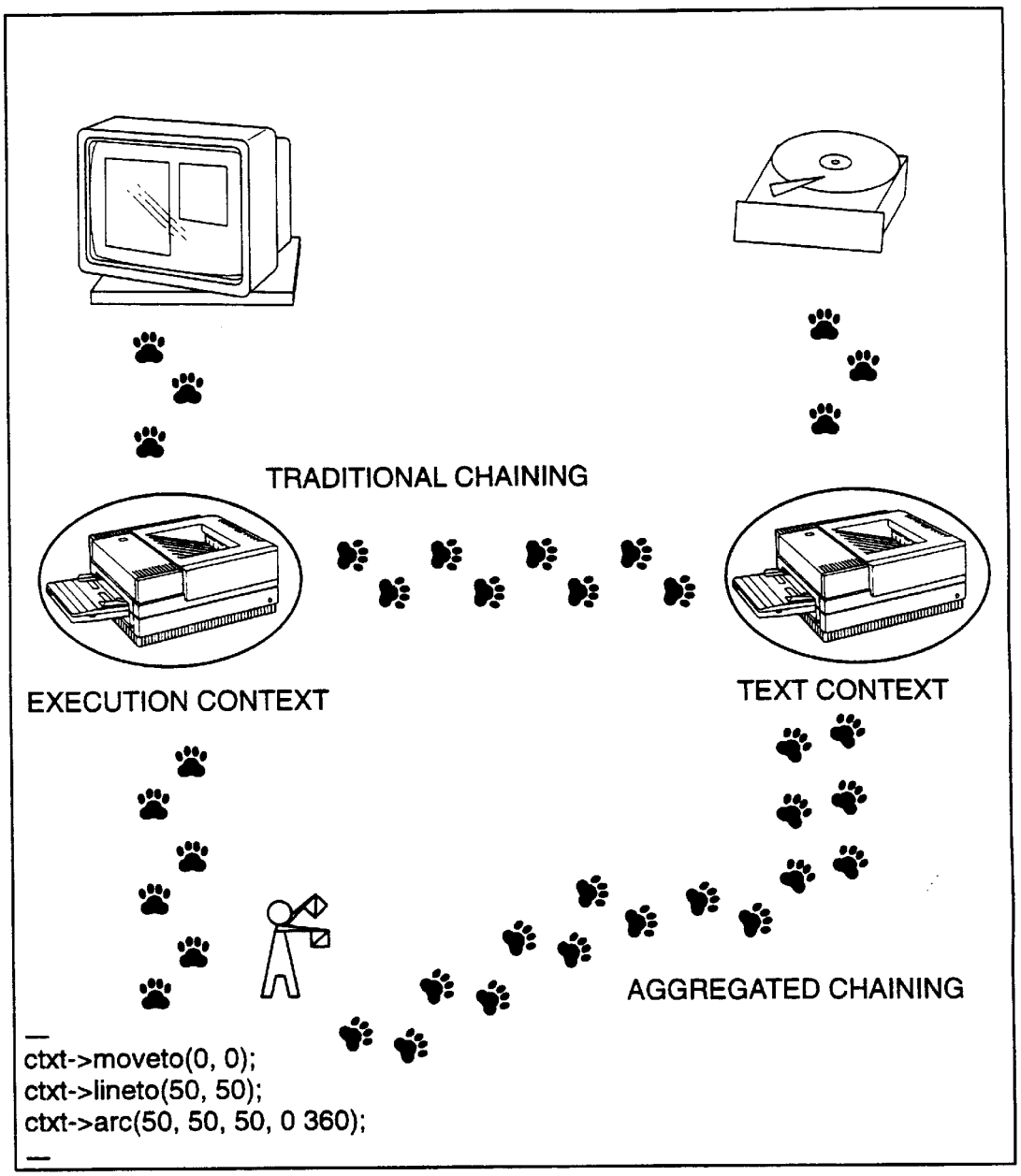
FIG._4

METHOD AND APPARATUS FOR PROVIDING AN OBJECT ORIENTED APPROACH TO A DEVICE INDEPENDENT GRAPHICS CONTROL SYSTEM

BACKGROUND OF THE INVENTION

1. Field of the Invention

The present invention relates generally to graphics control systems and methods. More particularly, the present invention relates to systems and methods for using a client-side object oriented model with a server-side imaging model, whereby the attributes of the different models can be exploited in a client/server environment which integrates any of a variety of different hardware platforms.

2. State of the Art

Known graphics control systems provide device independent graphics and text manipulations using standardized programming languages, such as the PostScript® language available from Adobe Systems Inc. As those skilled in the art will appreciate, the PostScript® language is an interpretive programming language having a graphics imaging model and programming constructs for describing an appearance of text, arbitrary graphical shapes and sampled images that are independent of the resolution of a device being used to reproduce the graphics (e.g., whether it is a printer, monitor, disk file or other device). For example, the imaging model can include a designation of an appropriate window coordinate system, a color space used to define each color which is to be represented, and so forth.

As described in the "PostScript® Language Reference Manual", 2d Edition, from Adobe Systems Inc., Addison-Wesley Publishing Co., Inc., 1990 (ISBN 0-201-18127-4), the contents of which are hereby incorporated by reference, the PostScript language can be used to communicate a description of a document from a composition system to a printing system, or to control the appearance of text and graphics on a display in a high level, device independent manner. An interpreter executes commands to paint characters, shapes and/or images, as it converts high-level, device independent PostScript language descriptions from the composition system into a low-level raster data format of a printer, display or other output device. The graphics capabilities of the PostScript language are embedded in an applications programming language which includes a toolkit and associated client library of higher level operations.

The manual entitled "Programming the Display PostScript™ System with X™", from Adobe Systems Inc., Addison-Wesley Publishing Co., Inc., 1993 (ISBN 0-201-62203-3), the contents of which are also incorporated herein by reference, further describes an exemplary device independent computer language. The Display PostScript system combines the PostScript imaging model with a windowing system, such as the known UNIX® based X Window System™ from the Massachusetts Institute of Technology, to provide a windows based system capable of using the same imaging model for both printers and active computer displays (i.e., DPS/X). The X Window System is a client/server, network based windowing system wherein the client, or application, runs in one process while the X server which is connected to the display and keyboard, runs in another process. The two processes can, for example, run on multiple computers in a network, with communication between the client and server being defined by the X protocol.

As those skilled in the art will appreciate, the Display PostScript system includes a PostScript interpreter, a client library for linking a client-side application with the PostScript interpreter, and a pswrap translator which takes PostScript language instructions and produces a "C" language procedure called a wrap that can be called from an application program. In operation, an application draws on a screen by making calls to client library procedures, which are used to generate PostScript language code that is sent to the PostScript interpreter for execution. The application creates a PostScript execution context (i.e., a virtual printer). The application then sends client library procedures and wraps to the context and receives responses from it.

A goal of the Display PostScript system is to assist application programmers in writing programs that output images to a printer which closely match images displayed on a computer monitor or written to file. However, existing graphics display and control systems do not provide application program developers with a familiar, efficient client-side environment that simplifies the development of client applications wherein a true match between images produced on a display, images produced by a printer, and/or images written to a disk file can be obtained. That is, true what-you-see-is-what-you-get (WYSIWYG) imaging is not easily achieved with these known systems.

One reason WYSIWYG imaging can not easily and efficiently be achieved with the PostScript systems is that the PostScript programming language provides a powerful imaging model, but does not include high level facilities for client-side application development. Application programs must therefore be developed in their native language. That is, the existing Display PostScript client library for the X Window System has been developed for code written in PostScript and compiled through the pswrap translator which tokenizes and batches PostScript operators into binary encoded X requests for execution. The use of client-side libraries for code written in the server-side programming language, such as PostScript, renders client-side application development time consuming, complex and inefficient. Further, because each client creates a context as a virtual PostScript printer that sends its output to a window or offscreen pixel map, the client library is limited and inflexible. Further, encoding is done statically, with all conditional statements of a program flow being binary encoded and resolved inefficiently with the PostScript interpreter. Existing client/server systems, because of the complexities associated with client-side application development, therefore constitute an impractical framework for developing true WYSIWYG applications whereby images which are displayed, printed, or written to file are virtually identical.

Accordingly, it would be desirable to provide a graphics control system and method which can provide true WYSIWYG applications which exploit the power of existing device independent graphics and text manipulations, while providing a high level of performance for interactive applications.

SUMMARY OF THE INVENTION

The present invention is directed to a method and apparatus for exploiting the power of existing device independent graphics and text manipulations, while providing a high level of client-side performance for interactive applications using an object oriented client-side library of constructs. The client-side constructs are analogous to the constructs of a selected server-side imaging model, so that the power and performance of existing imaging models (for example, constructs of the PostScript language) are exploited. In an exemplary embodiment, the client-side constructs are provided for use with the C++ programming language. By establishing a client-side object model using a library of constructs analogous to server-side imaging model constructs, program execution speed and efficiency can be improved without sacrificing the device independence of the imaging model. Using a common base class (i.e., a base class common to all output device platforms), an inherent level of transparency between printing to a display and printing to a file or to a printer is achieved in the client-side application development. Thus, the coupling of a complete representation of a given imaging model with the advantages of an object model written in a high level compiled language, such as the strongly-typed C++ language, enables true WYSIWYG applications to be efficiently developed and implemented.

Other advantages of a client-side library in accordance with exemplary embodiments of the present invention include: (1) transparent conversion to a fast executing encoding for a given construct; (2) binary encoding on-the-fly; (3) handling of function overloading and exceptions; (4) an ability to define and manipulate imaging model constructs, such as non-homogenous arrays and dictionaries, as objects in the client-side model (e.g., C++ objects); and (5) downloading only the necessary rendering directives to a server-side interpreter. Exemplary embodiments also use a context chaining feature to render the graphics control even more transparent between printing to a display and printing to a file or to a printer.

Generally speaking, exemplary embodiments are directed to a method and apparatus for providing graphics control comprising a server-side which provides device independent control in accordance with an imaging model of a client/server network, said server-side further including an interpreter for implementing device independent graphics and text manipulations; and a client-side which establishes an object oriented model of said client/server network, said object oriented model including constructs which are analogous to constructs of said imaging model. Further, a computer architecture is provided which has a memory for storing computer executable instructions for causing a computer to implement the steps of: establishing device independent control on a server-side of a client/server network in accordance with an imaging model; establishing an object oriented model on a client-side of said client/server network using constructs which are analogous to constructs of said imaging model; and implementing device independent graphics and text manipulations on said server-side in response to said object oriented model constructs.

BRIEF DESCRIPTION OF THE DRAWINGS

The foregoing and other features of the present invention will become apparent to those skilled in the art upon reading the following description of preferred embodiments of the invention in conjunction with the accompanying drawings, wherein:

FIG. 1 is an exemplary embodiment of a client/server system in accordance with the present invention;

FIG. 2 illustrates an exemplary flow chart for controlling an output device using a client/server system in accordance with an exemplary embodiment of the present invention;

FIG. 3 illustrates an exemplary flow of data from a client-side to a server-side of the FIG. 1 client/server system; and FIG. 4 illustrates an aggregated chaining feature in accordance with an exemplary embodiment of the present invention.

DETAILED DESCRIPTION OF THE PREFERRED EMBODIMENTS

As shown in FIG. 1, a client/server system 100 for providing graphics control includes a client-side 102 and a server-side 104. The client/server system 100 can be a network-based windowing system configured using one or more computers. The client, or application, can therefore run in one process while the server can run in another, separate process.

The server-side can, for example, include any processor which establishes device independent control in accordance with an imaging model. The server-side includes an interpreter 106 for implementing device independent graphics and text manipulations. Exemplary embodiments described herein build the server-side in accordance with any known imaging model, such as the known PostScript system and/or the Display PostScript system, wherein the X protocol can be adhered to for communication between the client-side and the server-side (that is, DPS/X).

In accordance with exemplary embodiments, the server-side includes a keyboard 108, a display monitor 110 and a file (memory) 112, any of which can communicate with one or more peripheral devices, such as a printer 114. The client-side can communicate with the server via a client-side interface and a server-side interface, the interfaces constituting, in basic terms, a communications link for sending and receiving information between the server-side and client-side. Further, the client-side can communicate with peripheral devices in place of the server, such as the printer 114 or a print spooler. The server handles outputs to the display, file and printer in response to object oriented model constructs represented as requests from client-side applications. Further, the server handles user inputs, such as keyboard entries or mouse movements, which it passes back to the client-side.

The client-side of FIG. 1 includes an imaging model which has been reconfigured as a comprehensive, fast executing object oriented model. The object oriented model includes an associated library of client/server interface constructs which form the basis for developing a higher level toolkit, a toolkit being a set of routines and data structures that simplify application development by defining objects and callback procedures. In accordance with an exemplary embodiment, the library is independent of whatever graphical user interface is native on a particular platform. Thus, the library need not be specifically used to render platform specific objects such as push buttons, scroll bars and so forth. However, those skilled in the art will appreciate that, if desired, objects such as push buttons, scroll bars, menus and so forth, can be combined to form complex windows, and that a callback procedure can be executed by the toolkit to notify an application when the user wishes to interact with a particular object.

The object oriented model established on the client-side includes constructs which are analogous to the constructs of the server-side imaging model (i.e., DPS/X). An exemplary object oriented environment which is established on the client-side takes advantage of fast executing programming languages such as C++. In the case of a C++ client-side object oriented model, the client-side is configured with a library of C++ constructs which can be executed by a server-side developed for use with a programming language better suited to execute device independent imaging capabilities, such as the PostScript programming language.

By developing a client-side around a fast executing object oriented model, enhanced processing efficiencies are achieved on the client-side. For example, when using the readily familiar C++ programming language, only necessary rendering directives (i.e., non-conditional directives to be executed) can be sent to the server-side interpreter, thereby reducing the workload of the server-side without sacrificing the performance associated with using a high level imaging model. Further, each client context accesses a dedicated portion of virtual memory space on the server-side, and the server-side interpreter merely handles scheduling associated with executing the contexts in time slices. The ability to reduce the workload of the interpreter associated with each context significantly improves the overall performance of the client/server network and the particular display server.

In accordance with exemplary embodiments, the combination of a high performance client-side object oriented model with a server-side that is based on a high level imaging model is achieved with the development of a class library that exposes dependencies on the imaging model only at very low levels of the context hierarchy in the client-side library. Accordingly, the hierarchical classification of the conventional imaging model constructs (e.g., PostScript constructs) within the client-side library constitutes a significant feature of the FIG. 1 system. Once a desired classification has been established, a programmer of ordinary skill can implement the functionality of the various constructs from the conventional imaging model in the client-side programming language to provide a client-side library as described above.

In accordance with an exemplary embodiment, primary user level constructs of a client-side object model library 116 are divided into categories of: contexts 118, non-homogenous arrays and procedures 120, user paths 122, transformation matrices 124, dictionaries 126, filters 128, scanners 130 and binary object sequences 132. Lower level implementation facilities can be directly accessed by an application to, for example, generate and manipulate binary object sequences and other encodings (e.g., system names and encoded number strings) of the server-side. A listing of hierarchical classes in an exemplary client-side library, along with a brief explanation of each class is set forth below. A more detailed description of each class, will follow the listing.

| | |
|---|---|
| RenderingContext | Basic PostScript Operator functions |
| •ClientContext | Display PostScript Client Library functions |
| •ExecutionContext | Adds return values from PostScript |
| •ScreenContext | Adds X Window-specific functions |
| •StreamContext | Writes all its PostScript as ASCII |
| •PrintContext | Opens pipe to print spooler |
| •MemoryContext | Accumulates PostScript for Binary Sequence |
| •UserPath* | Like a MemoryContext, but allows only path construction operands for high-performance. |
| •PSArray | Builds non-homogeneous literal or executable (i.e., PostScript procedures) arrays. |
| BinaryObjFactory | Low-level PostScript interface |
| NumberString | Encodes numbers into a number string. |
| TransformMatrix | High-level transformation matrix interface |
| UserName | Token representing a string |
| PageCounter | Brute-force page counting |
| ClientDict | General purpose key-value table |
| •AFMDict | Font Metrics |
| •TransformDict | Grouped transformation info |
| •DSCDict | Document Structuring Conventions |
| •ErrorDict | Information about last exception. |
| •PSDict | Can be downloaded to interpreter |
| •FormDict operator | Builtin dictionary for PostScript execform |
| •PatternDict operator | Builtin dictionary for PostScript makepattern |
| •ImageDict | Image description |
| •RasterDict | Rasterfile description for PostScript |
| •JPEGDict | JPEG JFIF file description |
| •SystemDict | Name to PostScript encoding mapping |

-continued

| | |
|---|---|
| Dictkey | Lookup key for dictionaries |
| DictStack | Stack of ClientDicts |
| •SysDictStack | Shared stack owned by the class library |
| FilterStream | I/O stream with filtered input |
| PSFilter | Filter stacked on a FilterStream |
| •HexDecode | Decodes hex input into ASCII |
| •HexEncode | Encodes data to 7-bit hex encoding |
| •SunRLEDecode | Sun Rasterfile Run Length Decoding |
| •Raster1Decode | Sun Rasterfile 1-bit decoding to PostScript |
| •Raster8Decode | Sun Rasterfile 8-bit decoding to PostScript |
| •Raster24Decode | Sun Rasterfile 24-bit decoding to PostScript |
| BinaryObjScanner automatically | Parses Binary Object Sequence encoding |
| •BOSPrinter | Parses Binary Object Sequence and emits ASCII |
| PSScanner | Scans ASCII PostScript |
| •PSCompiler encoding | Converts ASCII into Binary Object Sequence |
| PSException ErrorDict | Stores information about error in PostScript |
| •DictStackOverflow | Analogous to PostScript dictstackoverflow |
| •InvalidAccess | Analogous to PostScript invalidaccess |
| •InvalidContext | Analogous to PostScript invalidcontext |
| •IOError | Analogous to PostScript ioerror |
| •LimitCheck | Analogous to PostScript limitcheck |
| •RangeCheck | Analogous to PostScript rangecheck |
| •StackUnderflow | Analogous to PostScript stackunderflow |
| •StackOverflow | Analogous to PostScript stackoverflow |
| •TypeCheck | Analogous to PostScript typecheck |
| •Undefined | Analogous to PostScript undefined |
| •UndefinedFileName | Analogous to PostScript undefinedfilename |
| •UndefinedResult | Analogous to PostScript undefinedresult |
| •VMError | Analogous to PostScript vmerror |

The basic user-level classes of the foregoing library constitute an inheritance hierarchy, wherein lower level classes possess the attributes of higher level classes from which they derive. Each of the exemplary classes will now be further described.

Contexts

In accordance with exemplary embodiments discussed herein, contexts are streams of program instructions for the server-side interpreter. Each context corresponds to a virtual printer established by the client-side application. Where the server-side imaging model is based on the PostScript imaging model, a context can be considered a PostScript stream.

A first class of contexts is the rendering context which includes all of the standard operators associated with the PostScript imaging model (e.g., the standard PostScript operators) as well as any other desired operators (such as convenience operators associated with named colors and graphics state references that can be translated directly into basic primitives of the imaging model). The rendering context is the highest level context which represents a base class common to all contexts.

In the PostScript language "rendering" constitutes the control of a raster output device. In rendering, a user path is created as a procedure which includes path construction operators and their coordinate operands expressed, for example, as literal numbers. Exemplary path construction operators of the PostScript language include the "moveto" operator and the "lineto" operator. The "moveto" operator sets a current point on the output device (e.g., display) to specified coordinates (e.g., coordinates (x,y)). The "lineto" operator appends a straight line from a current position to coordinates specified in conjunction with the lineto operator (e.g., coordinates $(x_1,y_1)$).

As those skilled in the art will appreciate, a client-side library of the Display PostScript system can be accessed to initiate moveto and lineto operations, however, such implementation is awkward and complex. For example, the client library of the Display PostScript system involves the use of parallel arrays whereby operators are included in one array and operands are included in another parallel array, with a flag being used to tell the library which type of operand the array includes.

In contrast, in accordance with an exemplary embodiment of the system as described above, a client-side library implements rendering contexts, such as basic PostScript operators, using a programming language. Thus, the description of the operators corresponds to the function they perform, and the representation of operators and operands can be implemented without multiple arrays. For example, using C++, the complex representation of the "moveto" operator in the PostScript client library can be simply represented in the abovedescribed client library as "moveto (x,y)". Other basic operators of the PostScript language can be similarly represented in the client-side library using an object oriented language such as C++. Thus, those skilled in the art will appreciate that operators included in the client-side library rendering context class can be created which correspond to operators known in the PostScript language.

In addition to operators discussed above, primitives such as named colors can be included in the rendering context for direct translation into PostScript using a look-up table. In this case, the client-side application can ask for an input color by name (e.g., "red") without supplying a red "R", green "G", blue "B" value. The look-up table is addressed using a binary representation of the color "red", and outputs the PostScript language equivalent in an RGB value of the RGB color space used by PostScript. The output from the look-up table thus constitutes a direct translation into data usable by the server-side. The rendering contexts of the foregoing library constitute only generic (i.e., device independent) PostScript operators and primitives, the functionality of which has been implemented in a client-side programming language with which client-side programmers are familiar, such as C++.

A second class of contexts in the foregoing client library is the client contexts, which include all attributes of the rendering contexts. A client context, like the rendering context, includes attributes generic to all lower level contexts. The client contexts implement functionality of the Display PostScript client library (i.e., functions specific to the use of the Display PostScript system). For example, one such function is the "flush-context" function of the Display PostScript system used to trigger a transfer of data from a client-side binary object sequence buffer to the server-side interpreter. The advantages of encoding such functions will become more apparent when later discussing an exemplary implementation of client-side programming code. In summary, client contexts constitute Display PostScript library functions, but not operators, which have been rewritten in the client-side programming language, the functionality of these library functions being wrapped into a context.

The client context class was created separate from the rendering context to provide the option of creating rendering contexts which do not encompass client contexts and which are distinct from client contexts. In accordance with exemplary embodiments, a memory context and a PostScript Array context are complex buffers which possess attributes of the rendering contexts, but not the client context. For example, these complex buffers can represent non-homogenous arrays which were previously dealt with using the Display PostScript language on the server-side, but which can be easily dealt with on the client-side in accordance with the present invention using familiar client-side languages, such as C++. In an exemplary embodiment, a memory context and/or a PostScript Array context are therefore provided to accommodate this client-side capability. As will be further described below with respect to memory contexts and nonhomogeneous arrays, the creation of a separate class of rendering contexts which are not client contexts, thus provides for simplified handling of PostScript procedures (i.e., a procedure is a collection of function calls and/or starts, such as "moveto") on the client-side.

Execution contexts enable two-way interaction between the client-side and the server-side. An execution context can be used to send PostScript instructions into a context or to ask for information back from the context. Execution contexts are also generic, in that they are not dependent on the X portion of the Display PostScript system.

The foregoing contexts constitute higher level contexts which are generic to the lower level contexts to be described below. To better understand the distinction between the higher level contexts and the lower level contexts, it is helpful to consider the higher level contexts as abstractions of the lower level contexts. That is, the higher level contexts can be considered to define "what" information is to be forwarded to an output device, while the lower level contexts can be considered to define the specific output device "where" the information is to be forwarded.

Three types of lower level contexts will now be considered: (1) screen oriented contexts, which represent execution states in the server-side interpreter and which allow the client to render server-side code (e.g., PostScript) into a display window; (2) stream-oriented contexts which represent non-interactive (output only) contexts that can be used to write native rendering code to a print spooler or output file (e.g., contexts which correspond to Display PostScript contexts and text contexts in the Display PostScript client library); and (3) print contexts for opening a pipe to a print spooler.

Screen oriented contexts, such as a screen context, encapsulate specific parts, such as X-specific parts, of a class library. Such a context is interactive, and provides an ability for the application to specify rendering information. Further, an application can request various information from screen contexts, and use screen contexts to convert between multiple coordinate systems (e.g., between the X and PostScript coordinate systems). Screen contexts provide two-way interaction for X-specific instructions. The creation of a separate screen context class places all X-dependencies in one portion of the client-side library. Thus, when porting library code to a specific environment, it is only necessary to rewrite the screen context class of the client-side library, leaving the remaining environment generic portions of the library in tact.

Stream oriented contexts include a stream context and print context. These contexts can be used to direct a paint method or any arbitrary server-side programming to a file. The file can, for example, represent a named file or a print spooler.

Memory Contexts

Memory contexts represent a simple form of a rendering context used to collect native rendering operators (e.g., PostScript operators) and operands, and return a snapshot of these as a binary object sequence. Such contexts can, for example, be used when a particular sequence of server-side code is to be executed at different times. To save the overhead of regenerating the sequence each time it is needed, the client can generate the sequence once and then push this sequence onto a current context whenever it is needed. Further, such contexts can be used in conjunction with a client-side dictionary class (e.g., PSDict) which stores its data as binary object sequences. Higher-level interfaces can take a reference to a memory context directly so that the client need not be exposed to such detail.

User Paths

PostScript user paths are arbitrary paths which conform to a set of rules that allow the interpreter to render them more quickly than non-conforming paths. They are thus desirable in a Display PostScript environment where user interaction is necessary. Exemplary rules are that the path fit in a predetermined bounding box, that it specify all of its coordinates as constant values, and that it use only a pre-specified set of so-called path construction operators (e.g., moveto, curveto, lineto, and so forth). The user path is transformed by the current transformation matrix and graphics state.

User paths can be considered memory contexts, though they are not a proper subclass of the class rendering context. Because conventional user paths (e.g., PostScript Level 2 user paths) only accept a small subset of the entire PostScript language, exemplary embodiments create a separate class of library specific user paths.

Non-Homogeneous Arrays and Procedures

A class designated "PSArray", as described previously, corresponds to non-homogeneous arrays which are rendering contexts that store a server-side program sequence in memory until the sequence is pushed onto an output context. Non-homogeneous arrays have either the attribute literal or executable, the latter of which is also known as a server-side procedure (e.g. PostScript procedure).

Other PostScript Constructs and Facilitates

Additional constructs and facilities can, of course, be added to the library as desired. For example, the exemplary library described above includes a numberstring class for encoding numbers into a number string, a username class for token representation of a string, and a pagecounter class for providing page counting.

Low Level Implementation Facility

As mentioned previously, low level implementation facilities are also provided for generating and manipulating PostScript level 2 binary object sequences and other PostScript encodings. These classes are, for example, defined as a binary object factory class for providing a low-level PostScript interface, and a binary object scanner class for parsing binary object sequence encodings (e.g., provide an ability to compare two binary sequences for syntactical equivalence).

Exemplary embodiments improve client-side efficiency by reducing communications between the client and server even with respect to low level implementation facilities. For example, the known PostScript system will maintain a current transformation matrix (CTM) as part of the graphics context which gets applied to the current drawing path. In accordance with exemplary embodiments, a "transformmatrix" class encapsulates these matrices on the client-side, and allows the client to echo basic transformations, such as scaling, rotation and translation, on instances of the transform matrix object. This can help the client stay in sync with matrices in the interpreter without the considerable overhead of querying for it repeatedly. A library of an exemplary embodiment can also include a transform dictionary class which automatically obtains all of the current transformation information from the interpreter to eliminate querying delays.

Dictionaries and Dictionary Stacks

As represented in the summary of classes set forth previously, the PostScript dictionaries are located on the client-side where they can be accessed by the client-side application. As defined by the PostScript Language Reference Manual mentioned previously, a dictionary can be considered an associative table whose elements are pairs of PostScript objects, the first element of a pair being the key and the second element being the value. PostScript operators insert a key value pair into a dictionary, lookup a key and fetch the associated value. In accordance with exemplary embodiments wherein the PostScript operators have been implemented in the object oriented language of the client-side, efficient program development can be achieved by also including dictionaries on the client-side as well.

Dictionaries allow the application developer to generically associate keys (strings or integers) with arbitrary values using, for example, look-up tables. Dictionary stacks allow even greater flexibility by allowing objects to share and override information stored in dictionaries. Entire dictionaries can be downloaded to the interpreter through a sixth class represented as a special type of dictionary, referred to herein as PostScript dictionary. The PostScript dictionary stores all of its information using a representation known to the server-side interpreter.

In an exemplary embodiment, three standard dictionary types are provided: class pattern dictionary, class form dictionary, and class image dictionary, which correspond to the dictionary operands of PostScript setpattern, execform, and image operators, respectively. Image dictionary subclasses are also provided to, for example, wrap format images (such as the known Sun Rasterfile and JPEG JFIF format images) as PostScript image objects.

Shared dictionaries are also provided, in which all instances point to a common set of data, and are suitable to be created as automatic variables in client code. An exemplary client-side library of the exemplary FIG. 1 embodiment includes two examples of a shared dictionary: class system dictionary for mapping PostScript key words to their respective system name encodings; and class error dictionary, which can be used to store information about recent exceptions thrown by the library. Shared dictionary stacks are dictionary stacks which all point to a common list of dictionaries. An example of a shared dictionary stack, class system dictionary stack, can be included in the FIG. 1 embodiment as the primary global dictionary stack for an application. Such a dictionary stack can, for example, have one built-in dictionary on its stack which can not be removed.

Filters

As defined in the PostScript Language Reference Manual, a filter is an object that can be layered on top of some other file to transform data being read from or written to that file in a way which depends on the filter. Two general classes of filters described in the PostScript Manual are an encoding filter class and a decoding filter class. Specifics of these filters are not necessary to an understanding of aspects of the present invention, but are merely mentioned herein as being incorporated into the client-side library.

The data filtering mechanism of the PostScript language can be directly layered on a file stream so that data being read or written automatically gets converted through the filters in the process. Similarly, the class library provides a system for client-side filtering that has the benefit of being extensible by the client program. Therefore, filters can be created to handle whatever data type is necessary. For example, hex encoding and decoding filters can be used for sending 8 bit data through transports, such as serial printers, which may not be 8 bit clean.

Scanners

The client-side library includes classes that scan through ASCII and binary PostScript and provide callbacks which get invoked with the appropriate information. Because binary encoding is performed on the client-side, the inefficiencies associated with a server-side scanning and callback to the client-side can be avoided. The ability to scan on the client-side is primarily of interest to tool developers who aren't interested in the details of binary encoding. In addition, this feature is important for the PostScript compiler class, which translates ASCII PostScript into the binary object sequence format used by the rest of the client-side library, and which can be considered an "on the fly" version of the pswrap utility. This feature will be described further with respect to an example set forth below.

Binary Object Sequences

PostScript Level 2 defines two different binary encodings: binary tokens and binary object sequences. Binary tokens are compact for long term storage, while binary object sequences correlate tightly to PostScript's internal representation and thus execute more quickly by bypassing the scanning phase. Binary object sequences can also be used to represent the entire PostScript language, while binary tokens only represent the most commonly used operators. This is another reason binary tokens are generated by the pswrap utility included with the Display PostScript System.

In accordance with exemplary embodiments, the client-side library uses binary object sequences as its internal representation because they are easy to operate on (that is, type and size information is known), and because they can operate more quickly in the interpreter for better user interaction in a Display PostScript environment. The class binary object factory is used to create binary object sequences from arbitrary input, in known manner. A class binary object sequence scanner includes a set of static member functions, in addition to its scanning capability, that allow the user to look at information in a binary object sequence without knowing the encoding itself.

A final class of the client-side library summarized above is a class designated PostScript exception for providing general-purpose exception-handling facilities. For purposes of illustrating aspects of the present invention, typical PostScript exception handling facilities have been described in the exemplary library set forth above. The facilities are written in C++ programming code for use with the client-side object model, the specifics of the individual exception-handling facilities being unnecessary to an understanding of the present invention. However, reference is made to the aforementioned manual entitled "PostScript Language Reference Manual" for a further discussion of the exceptions thrown by the PostScript language.

It can now be appreciated that significant advantages over conventional client interfaces can be achieved as a result of several important distinctions. For example, the client-side manages its own context parameters with high-level interfaces (e.g., using C++). Further, text contexts are encapsulated as stream contexts, to form a foundation on which printing is built. Another advantage is that what-you-see-is-what-you-get (WYSIWYG) is a primary consideration. Because interfaces which are not friendly toward text contexts would not typically be conducive to creating WYSIWYG-applications, all basic interfaces of the server-side (e.g., all PostScript functionality) is available to both stream and screen oriented contexts via the client-side library. While the X-specific functionality is not directly available to stream contexts, class implementations can check run time information to deal with both cases in any desired manner.

Further, because exemplary embodiments of the system are configured so that device dependencies are excluded from the high-level class interfaces of the client-side library, a framework is provided whereby a client-side toolkit can be more easily developed to provide true WYSIWYG. That is, drawbacks associated with existing client-side toolkits, such as the Display PostScript client-side toolkit can be avoided so that true WYSIWYG can be realized. For example, invoking the PostScript scale and/or rotate operators prior to imaging a PostScript file will produce an expected result. Further, the interface is simplified by, for example, taking a transformation matrix as a parameter or through the system dictionary stack as described previously. This also helps remove unnecessary complication from the interface.

To help illustrate features of an exemplary embodiment of the above-described system, a comparison of a traditional PostScript client-side application versus a client-side application in accordance with the above-described system will be provided. In the following diagram, the left hand side corresponds to a client-side application written using the Display PostScript toolkit, while the right hand side corresponds to the same programming sequence written in C++ using a client-side library in accordance with the present invention:

```
-drawLines2           void draw_lines2 ()
}             {
float a;      UserPath up(bounds,
Userpath::cached);
float *cArray;
char *oArray;         for(Real a=0.0;
a<bounds.w; a+=interval) {
float bbox[4];        up.moveto(a,0.0)
int oi=0, ci=0;       up.rlineto(0,150);
int size = (int)(bounds.size.width/(interval));     }
/* fill cArray and oArray */    ctxt->ustroke(up);
cArray =(float*)malloc(4*numLines*sizeof(float));   }
oArray =(char*)malloc(2 + 2*numlines*sizeof(char));
aArray[oi ++]=dps_ucache;
oArray[oi ++]=dps_setbox;
for(a =0.0;a <bounds.size.width; a +interval) {
cArray[ci++]=a;
cArray[ci++]=0.0;
oArray[oi++]=dps_moveto;
cArray[ci++]=0.0;
cArray[ci++]=150.0;
oArray[oi++]=dps_rlineto;
}
/* fill bbox /*
bbox[O]=0.0;
bbox[1]=0.0;
bbox[2]=bounds.size.width;
bbox[3]=150.0;
DPSDoUserPath(cArray,ci,dps_float,oArray,oi,bbox,dps_ustroke);
free(cArray);
free(oArray);
}
```

As those skilled in the art will appreciate, the application set forth above is complex when programmed using the Display PostScript toolkit and its variable size, parallel arrays: "cArray" for operands and "cArray" for operators. In contrast, the same functionality can be achieved with client-side application programming being performed using a strongly typed C++ language and the exemplary client-side library described previously, wherein each operator variation is defined as a separate class method. That is, each operator is associated with a limited number of operands, the operands being of a fixed type (e.g., real numbers or integer numbers). Thus, there are two different "moveto" operators, one for integers and one for real numbers thereby eliminating the need for multiple, variable size arrays.

Both of the programming sequences set forth above perform the function of drawing a line at a predetermined position on a screen display. However, the readily familiar C++ programming language implements programming steps in a sequence which is logical to the programmer. For example, beginning from a position of 0,0, a line is drawn to a position 0,150 (note the descriptive steps in the C++ program). In accordance with exemplary embodiments, the client-side application is binary encoded on-the-fly and flushed to the server-side interpreter, thereby avoiding any need for the application developer to use native PostScript language code. Rather, the attributes of the device independent imaging model have been embedded in the client/server of exemplary embodiments.

By implementing the application in C++, conditional directives included in the client-side program are resolved before being forwarded to the server-side interpreter, thereby ensuring that only those directives which are necessary to achieve the desired functionality will be forwarded to the interpreter. Such a feature saves significant time, since unnecessary programming sequences need not be parsed.

Further for purposes of illustration, a flow chart of operations associated with controlling a screen display will be provided with respect to FIG. 2. In the first step of FIG. 2, a window which is to be created on a screen is established in step 202 in any known fashion.

Having created a window on a screen which is to be drawn into, the next step is a setup step 204. In the setup step, a context representing a foundation library class, is created and given an identification. The context represents a virtual output device. For example, a context can be defined on the client-side with the statement: ctx= newScreenContext(Window identification). As described with respect to the library classes above, a screen context inherits all of the functionality of the contexts above it (e.g., the screen context can be created using the operators of the higher level, device independent rendering context, such as "moveto", "lineto" and so forth). A screen context is a window system specific context, such that the screen context is written for a specific environment with which it is to be ultimately used.

Having created a screen context, the actual screen display functionality to be implemented is established via a client application which has been developed using the client-side library (i.e., step 206). As mentioned previously, because a readily familiar, fast executing client-side programming language such as C++ is used, the screen functionality can be easily developed and implemented by the client-side application developer. For example, to establish a line on the screen display of the current screen context, the following steps can be programmed in the client-side application:

ctx→moveto(0,0);
ctx→lineto(20,20)

In the foregoing statements, the arrow symbol designates operators and associated operands to be executed within the current context (ctx). The two statements set forth above constitute instructions for establishing a line on the screen context. The PostScript operators "moveto" and "lineto" each accept two numbers as arguments. These statements, are binary encoded on-the-fly in the manner to be described later, and once "flushed" to the server-side, will be used in drawing a line from a two dimensional coordinate position of (0,0) to (20,20).

In addition to the steps described above for implementing functionality in the screen display, an additional two statements are established in step 206 to actually draw the line once these statements are "flushed" to the server-side. These additional two statement are:

ctx→stroke( );
ctx→flush-context( ).

These steps are PostScript operators which are used to actually draw a line using the PostScript imaging model notions of thickness and color. Of course, those skilled in the art will appreciate that the client-side user can readily change the graphics state to change color and/or thickness, and to modify the foregoing steps in any desired fashion. If specific settings for such attributes as color and thickness are not set, default settings of color and thickness in the imaging model will be used.

In accordance with exemplary embodiments, it is the functionality implemented in step 206 provides significant advantages. That is, the functionality can be easily defined on the client-side in an efficient, fast executing manner, yet be implemented on the server-side using a powerful device independent display language such as that of the Display PostScript system.

A further advantage of using the C++ programming language in accordance with exemplary embodiments is that conditional instructions can be resolved on the client-side in step 208. That is, an object oriented programming language such as C++ can resolve conditional directives, such that an entire programming sequence need not be forwarded to the server-side PostScript interpreter. Rather, only the non-conditional statements are forwarded to the server-side for execution.

The advantages of avoiding conditional statements on the server-side may be better understood with reference to an exemplary conditional statement:

If level 1, execute path A; else execute path B;
ctxt→language level (number);

The foregoing statements tell the current context to find out what the "level" is and return it as an integer "number". On the client-side, a conditional statement is then used as follows:

If number=2, ctxt→set RGBColor (1,0,0);
Else ctxt→set gray (0.5).

In the latter statement, if "number" was returned as "2", then color can be implemented in the context. Otherwise, gray scale or black/white imaging is implemented. Those skilled in the art will appreciate that the key to the foregoing example is that conditional statement for determining whether the current context can accommodate color imaging is resolved on the client-side, so that only binary encoding of non-conditional statements is performed (e.g., if the current context can not accommodate color, binary encoding of the client-side application is limited to features which relate to gray scale imaging). The foregoing example is written in a pseudo code to facilitate understanding of the description.

Thus, significant advantages are achieved by using a strongly typed programming language such as C++ on the client-side. An additional efficiency which is achieved by using such a programming language is the previously mentioned ability to binary encode on-the-fly, thereby avoiding the static encoding associated with the client-side programming of the PostScript systems. To better understand this aspect, one might consider a binary object sequence which is created with the screen context in the above example.

A binary object sequence is, for purposes of exemplary embodiments described herein, a buffer which sequentially stores the binary encodings of the operators (e.g., "moveto") and their associated arguments. When the "moveto" function is called, the first operand of the function is placed in the first location of the binary object sequence buffer. The next operand of the "moveto" function is then placed into the next location of the binary object sequence buffer. The operand itself (i.e., "moveto"), in its binary encoded format, is then placed into the third location of the buffer. Similarly, binary encodings for "20", "20", and "lineto" are placed into successive locations of the binary object sequence buffer, followed by the stroke operator. The on-the-fly binary encoding of the C++ application is also represented by step 208.

As those skilled in the art will appreciate, if the binary object sequence buffer becomes full, then an implicit flush is used to dump the buffer to the X-server. However, when writing client-side code, the programmer does not know when this will happen (i.e., this is a transparent operation). Thus, by making an explicit call to the function "flush-context" in the above example, all information in the binary sequence buffer is dumped to the X-server in step 210 for scheduling and execution, whereby the line in the above example is drawn. That is, execution of the operators is scheduled on the server-side to implement the drawing of a line in the screen context.

Of course, rather than using the flush-context function, other statements, can be used to achieve the same effect in synchronizing the dumping of the binary object sequence buffer before it becomes full. For example, the statement: "ctx→wait-context( )" initiates a sending of information to the server. Such a feature inhibits further control from being provided back to the client-side application until the current directives are executed. Thus, in the above example, control would not be provided back to the programmer client-side application until the context had been flushed, rendered on the screen and an indication provided back to the client-side. After a flush-context, the entire binary object sequence buffer is wrapped-up and sent to the X-server on the server-side, which sends it to the display PostScript system.

An attendant advantage is that the binary encoding of the application on the client-side permits the traditional scanning phase of a PostScript server to be eliminated. More particularly, the server automatically recognizes when it receives information in binary encoded form, thereby eliminating the need for the system to perform a scanning and binary encoding of the data on the server-side. Thus, the binary encoding of the client-side application on-the-fly eliminates the scanning phase of the server-side, thereby further enhancing processing efficiency.

Once the application is binary encoded, it is forwarded to the server-side in step 210. In step 212, a query is made to determine whether the encoded information from the client-side is an extension of X. If so, use of an X-specific interface in step 214 is necessary. Once the encoded information has been properly processed in the X server in known fashion, it can be produced at an output device as represented by step 216.

Another advantage is that adaptation to a specific hardware platform can be easily implemented by changing only those portions of the client-side library which have components that are device specific, such as the screen contexts. This is because the foundation class library described above uses a hierarchical classification.

Another attendant advantage of the invention is that up to the level of the client context, the screen context and print context programming sequences are interchangeable (i.e., one can be substituted for the other if the specific functionality is not used). Therefore, for printing, the code can be inserted to a function, such as the C++ function "drawsome-thing (client context→ctx)" without creating device dependence. In this example, a client context pointer is used instead of a screen context pointer, such that the context is generic to the printer or screen. That is, a single set of drawing code can be used for the printer or display. Such a feature reflects a fundamental aspect of the present invention, which allows true WYSIWYG imaging.

In accordance with exemplary embodiments, by using the same code for the printer or for the display, instead of creating a screen context, the context is moved to a function and used as a pointer. For example, to provide generic coding, a client context pointer is used instead of using a screen context. In the foregoing example, the term "ctx" is generic to the screen context or the printer context. Thus, if the programmer wanted to do something that was screen specific, the program can be implemented such that when the code is executed, the code asks for the type of context being executed so that any specific programming instructions can be implemented to accommodate the specific type of context. The functionality of the "drawsomething" operator of PostScript can be included in the client-side library to provide this capability. After implementing the drawsome-thing step, the remaining steps of the programming example described with respect to the FIG. 2 flow chart are implemented to create a window, create a screen context, and actually implement the programming instructions to draw within the desired screen context.

Thus, from the foregoing example, those skilled in the art will appreciate that the hierarchy of the client-side library should be maintained as generic as possible to enhance portability. The present invention is therefore directed to the use of a base class with contexts that talk to a printer, a display or to a file. Further, constructs of an interpretive language are maintained on a client-side to provide more efficient use of the server-side interpreter. At the same time, a programming model is provided on the client-side which is compatible with C++ rather than the more awkward and cumbersome PostScript language.

FIG. 3 illustrates an exemplary flow of data through a system in accordance with an exemplary embodiment of the present invention. Information which is input via the client-side programming sequence is buffered in a binary object sequence buffer 302. Information from the binary object sequence buffer 302 is then supplied to a context 304. In response to a "flush ", information associated with the context is supplied to the X connection of the server-side X server 306 (i.e., a physical connection to, for example, the server-side interpreter or to a file). Those skilled in the art will appreciate that X has an internal device dependent layer (e.g., a layer for drawing a line on a screen). From the X-server, data flows to the Display PostScript system which interprets the information, reads and recognizes Display PostScript commands and sends it to an output device 308 accordingly.

Yet another feature for improving efficiency of conventional graphics control in client/server systems will now be described with respect to FIG. 4. A WYSIWYG framework implemented by a class library is an extension of the context chaining facilities of the Display PostScript client library. The term context chain typically refers to a feature whereby all of the server-side code being sent to one context also gets sent to all of the others that are chained to it. For example, by chaining a text context to an execution context, one would get to see all of the PostScript sent to a Display PostScript server be echoed to the standard output file for debugging perusal. A hierarchically configured class library goes even further. For example, a standard paint method is defined first, and then a paint chain method is added which walks up to the top of the context chain and then walks back down, invoking all of the paint methods that it finds along the way to, for example, provide text manipulations which correspond to specified graphics manipulations. In this way, a stream oriented context which writes PostScript code as ASCII can get the PostScript code from another context (e.g., a screen context) through aggregation, rather than by having the screen oriented context repaint itself in order for the stream context to get its PostScript code (as illustrated in FIG. 4).

The foregoing discussion has been directed to an exemplary embodiment of the invention, wherein an object oriented C++ client-side interface spans the breadth of the PostScript language operators and constructs, and takes advantage of the client-side object model to optimize the performance of the Display PostScript system. The client-side library is a framework which incorporates these constructs into a cohesive environment for which high level tools, interfacing and applications can be built that take the best advantage of a device independent imaging model for implementing true WYSIWYG applications. However, those skilled in the art will appreciate that the invention is not limited to the exemplary embodiments described above. For example, any client-side object oriented model which provides a desired level of performance and user friendliness can be selected. Similarly, any server-side imaging model which provides a desired level of device independent graphics and text manipulations can be selected.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A client/server network for providing WYSIWYG graphics control of a graphics device, comprising:
    a server-side which establishes device independent control of said graphics device based on interpretive graphics language constructs of an imaging model, said server-side further including an interpreter for implementing device independent graphics and text manipulations; and
    a client-side which establishes an object oriented model, said object oriented model including object oriented programmatic constructs which are analogous to said interpretive graphics language constructs of said imaging model of said server-side, so that said graphics device can be controlled by an object-oriented client-side application program containing one or more of said object oriented programmatic constructs.

2. Network according to claim 1, wherein said client-side is a window environment.

3. Network according to claim 2, wherein said object oriented model executes as a compiled C++ program.

4. Network according to claim 2, wherein said object oriented model includes a hierarchical client library.

5. Network according to claim 4, wherein said object oriented model includes a common base class for establishing transparency between printing to a display, a file or a printer.

6. Network according to claim 1, wherein said client-side only sends non-conditional directives to said server-side.

7. Network according to claim 5, wherein said client-side only sends non-conditional directives to said server-side.

8. Network according to claim 5, wherein said client library includes contexts, dictionaries and scanners.

9. Network according to claim 8, wherein said client library includes memory oriented contexts for implementing non-homogeneous arrays and user paths.

10. Network according to claim 9, wherein said client library further includes:
    memory contexts for executing a predetermined sequence of server-side code at different times on the server-side, while generating such code only once on said client-side.

11. Network according to claim 1, wherein said client-side binary encodes a client-side application on-the-fly.

12. Network according to claim 6, wherein said client-side binary encodes a client-side application on-the-fly.

13. A method for providing WYSIWYG graphics control comprising the steps of:
    establishing device independent control on a server-side of a client/server network in accordance with an imaging model having interpretive graphics language constructs to control a graphics device;
    establishing an object oriented model on a client-side of said client/server network by providing a set of object oriented programmatic constructs, each of said object oriented programmatic constructs being analogous to and corresponding to each of said interpretive graphics language constructs of said imaging model of said server-side; and
    implementing device independent graphics and text manipulations on said server-side in response to said object oriented programmatic constructs, so that said graphics device can be controlled by an object-oriented client-side application program containing one or more of said object oriented programmatic constructs.

14. Method according to claim 13, further including a step of:
    executing a client-side application as a compiled C++ program.

15. Method according to claim 13, wherein said step of establishing an object oriented model further includes the step of:
    creating a hierarchical client library having a common base class for establishing transparency between printing to a display, a file or a printer.

16. Method according to claim 13, further including a step of:
    resolving conditional statements of a client-side application on said client-side prior to said step of implementing device independent graphics and text manipulations.

17. Method according to claim 16, further including a step of:
    binary encoding said client-side application on-the-fly during execution of said client-side application on said client-side.

18. A client/server network comprising:
    a server-side which establishes device independent WYSIWYG control of a graphics device based on interpretive graphics language constructs of an imaging model, said server-side further including an interpreter for implementing device independent graphics and text manipulations; and
    a server-side interface for receiving communications based on client-side object oriented programmatic constructs that are analogous to said server-side imaging model interpretive graphics language constructs, so that said graphics device can be controlled by an object-oriented client-side application program containing one or more of said object oriented programmatic constructs.

19. A network according to claim 18, further comprising:
- a client-side which establishes an object oriented model, said object oriented model including said object oriented programmatic constructs which are analogous to said interpretive graphics language constructs of said imaging model.

20. A network according to claim 19, wherein said object oriented model executes as a compiled C++ program.

21. A network according to claim 19, wherein said object oriented model includes a hierarchical client library having a common base class for establishing transparency between printing to a display, a file or a printer.

22. A network according to claim 19, wherein said client-side only sends non-conditional directives to said server-side.

23. A network according to claim 21, wherein said client library includes contexts, dictionaries and scanners.

24. A network according to claim 21, wherein said client library includes memory oriented contexts for implementing non-homogeneous arrays and user paths.

25. A network according to claim 24, wherein said client library further includes:
- memory contexts for executing a predetermined sequence of server-side code at different times on the server-side, while generating such code only once on said client-side.

26. A computer architecture having a memory which stores computer executable instructions for causing a computer to implement the steps of:
- establishing device independent WYSIWYG control on a server-side of a client/server network in accordance with a server-side imaging model;
- establishing an object oriented model on a client-side of said client/server network using object oriented programmatic constructs which are analogous to and correspond to interpretive graphics language constructs of said imaging model of said server-side; and
- implementing device independent graphics and text manipulations on said server-side in response to said object oriented programmatic constructs so that said graphics device can be controlled by an object-oriented client-side application program containing one or more of said object oriented programmatic constructs.

27. A client/server network for controlling a graphics device, comprising:
- a client-side which establishes an object oriented model, said object oriented model including object oriented programmatic constructs which are analogous and have a correspondence to interpretive graphics language constructs of a device independent imaging model; and
- a client-side interface for sending communications based on said object oriented programmatic constructs for use as said interpretive language constructs of said device independent imaging model, so that said graphics device can be controlled by an object-oriented client-side application program containing one or more of said object oriented programmatic constructs.

28. A network according to claim 27, further including:
- a server-side which establishes device independent control based on said interpretive graphics language constructs of said imaging model, said server-side further including an interpreter for implementing said device independent graphics and text manipulations.

29. A network according to claim 27, wherein said object oriented model executes as a compiled C++ program.

30. A network according to claim 27, wherein said object oriented model includes a hierarchical client library having a common base class for establishing transparency between printing to a display, a file or a printer.

31. A network according to claim 27, wherein said client-side only sends non-conditional directives to said server-side.

32. A network according to claim 30, wherein said client library includes contexts, dictionaries and scanners.

33. A network according to claim 30, wherein said client library includes memory oriented contexts for implementing non-homogeneous arrays and user paths.

34. A network according to claim 33, wherein said client library further includes:
- memory contexts for executing a predetermined sequence of server-side code at different times on the server-side, while generating such code only once on said client-side.

* * * * *